United States Patent
Ben-Natan et al.

(10) Patent No.: US 11,144,580 B1
(45) Date of Patent: Oct. 12, 2021

(54) COLUMNAR STORAGE AND PROCESSING OF UNSTRUCTURED DATA

(71) Applicants: Ron Ben-Natan, Lexington, MA (US); Ury Segal, Vancouver (CA)

(72) Inventors: Ron Ben-Natan, Lexington, MA (US); Ury Segal, Vancouver (CA)

(73) Assignee: Imperva, Inc., San Mateo, CA (US)

( * ) Notice: Subject to any disclaimer, the term of this patent is extended or adjusted under 35 U.S.C. 154(b) by 377 days.

(21) Appl. No.: 14/304,497

(22) Filed: Jun. 13, 2014

Related U.S. Application Data

(60) Provisional application No. 61/957,035, filed on Jun. 24, 2013, provisional application No. 61/835,603, filed on Jun. 16, 2013.

(51) Int. Cl.
*G06F 16/35* (2019.01)

(52) U.S. Cl.
CPC .................. *G06F 16/353* (2019.01)

(58) Field of Classification Search
CPC .............................. G06F 7/24; G06F 17/30595
USPC .......................................................... 707/752
See application file for complete search history.

(56) References Cited

U.S. PATENT DOCUMENTS

| | | | | |
|---|---|---|---|---|
| 8,560,508 B2* | 10/2013 | Amit | .................. | H03M 7/30 707/693 |
| 2005/0108212 A1* | 5/2005 | Karimisetty | ...... | G06F 17/30525 |
| 2006/0064428 A1* | 3/2006 | Colaco | ............. | G06F 17/30917 |
| 2007/0038656 A1* | 2/2007 | Black | .................. | G06F 3/0622 |
| 2008/0091693 A1* | 4/2008 | Murthy | ............. | G06F 17/30929 |
| 2008/0097806 A1* | 4/2008 | Hoover | ............. | G06Q 10/0631 705/7.12 |
| 2009/0125830 A1* | 5/2009 | Marcek | ................ | G06F 9/4443 715/771 |
| 2010/0036862 A1* | 2/2010 | Das | ................... | G06F 17/30917 707/698 |
| 2010/0146218 A1* | 6/2010 | Langendorf | ........ | G06F 12/0831 711/146 |
| 2010/0293189 A1* | 11/2010 | Hammad | ................ | G06F 21/31 707/769 |
| 2011/0264650 A1* | 10/2011 | Tobin | ................ | G06F 17/30554 707/722 |
| 2012/0117080 A1* | 5/2012 | Lamanna | .......... | G06F 17/30613 707/747 |
| 2013/0066877 A1* | 3/2013 | Raanan | ............. | G06F 16/24542 707/741 |
| 2013/0254171 A1* | 9/2013 | Grondin | ................ | G06F 16/256 707/693 |
| 2014/0108460 A1* | 4/2014 | Casella dos Santos | ..................... | G06F 16/35 707/794 |
| 2014/0122479 A1* | 5/2014 | Panferov | ............... | G06F 3/0643 707/736 |

(Continued)

*Primary Examiner* — Allen S Lin
(74) *Attorney, Agent, or Firm* — Armis IP Law, LLC

(57) ABSTRACT

Data storage for unstructured data such as JSON data stored as collections of documents transforms the JSON data into a columnar form of storing unstructured data by grouping similar fields together for facilitating retrieval of the individual fields from a range of documents. Groups of fields are stored in individual files for each field. Compound data such as arrays and subdocuments are also broken down into files for each atomic field. In other words, a compound document structure that defines a hierarchy or "tree" of fields is flattened such that each "leaf" of the tree is stored in a separate file.

13 Claims, 8 Drawing Sheets

(56) References Cited

U.S. PATENT DOCUMENTS

| | | | |
|---|---|---|---|
| 2014/0172775 A1* | 6/2014 | Niehoff | G06F 17/30289 |
| | | | 707/600 |
| 2014/0282402 A1* | 9/2014 | Eksten | G06F 9/5072 |
| | | | 717/123 |
| 2015/0294007 A1* | 10/2015 | Chen | G06F 16/24578 |
| | | | 707/749 |

* cited by examiner

COLUMNAR STORAGE AND PROCESSING OF UNSTRUCTURED DATA

RELATED APPLICATIONS

This patent application claims the benefit under 35 U.S.C. § 119(e) of U.S. Provisional Patent App. No. 61/835,603, filed Jun. 16, 2013, entitled "SYSTEM AND METHOD FOR STORING AND RETRIEVING JSON-BASED INFORMATION IN COLUMNAR FORMAT," and on U.S. Provisional Patent App. No. 61/957,035, filed Jun. 24, 2013, entitled SYSTEM AND METHOD FOR STORING AND SYNCING UNSTRUCTURED DATA ON MOBILE DEVICES," both incorporated herein by reference in entirety.

BACKGROUND

Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions.

Unstructured databases have no formal field or record structure, and may be more accurately characterized as a collection of facts. Unlike their structured counterparts, typically a SQL (Structured Query Language) database, which denotes data in fixed length fields enumerated in records in a tabular form, an unstructured database labels fields for storing values in a document. A set of documents defines a collection, in which the documents in a collection may share some, none, or all of a particular field. The document-based arrangement of unstructured databases stores the documents in a sequential order, typically in a sequence of readable characters with delimiters to denote fields (i.e. Unicode, ASCII, or similar). Each document stores a set of fields of the document together. Accordingly, reading a common field from a range of documents typically involves parsing each of the documents and retrieving the desired field. In a large collection having many documents, the volume of parsed documents can be substantial.

SUMMARY

Configurations herein are based, in part, on the observation that the document based arrangement of unstructured databases may require parsing a substantial number of documents in order to extract a common field (e.g. name, address, age).

Unfortunately, conventional approaches to processing unstructured data suffer from the shortcoming that retrieval of a particular field requires traversal of all documents even if only one or two fields are sought in each document. In a large unstructured data store, traversal of all documents may require substantial computing resources. Accordingly configurations herein substantially overcome the above-described shortcomings of storing unstructured data by grouping similar fields together for facilitating retrieval of the individual fields from a range of documents. Groups of fields, in the example arrangement, are stored in individual files for each field. Compound data such as arrays and subdocuments are also broken down into files for each atomic field. In other words, a compound document structure that defines a hierarchy or "tree" of fields is flattened such that each "leaf" of the tree is stored in a separate file.

Described below is a method and apparatus for implementing a "Big Data" system for storing, retrieving, querying and managing unstructured data formatted as JSON (JavaScript Object Notation) documents. The system stores the data in a column-centric (versus document-centric) order allowing for advantages such as reduced storage space due to compression and faster query times. The disclosed system employs a column-store that deals with unique attributes of unstructured data including a flexible and sometimes non-existent schema, recursive document structures, ability of the same fields for different documents in a collection to have different types and even evolving types, and other unique properties of JSON.

The disclosed approach employs a columnar format that groups similar fields together in a file specific to the field. Fields are identified by name from the unstructured data collection (collection) and stored together in a file. Values are written in the same order as the documents that they appear, so that values from the $3^{rd}$ document in the collection, for example, are all stored at the third position in the respective file. Accordingly, in the columnar database, all the column 1 values are physically together, followed by all the column 2 values, etc. This allows individual data elements, such as customer name or ID #, for instance, to be accessed in columns as a group, rather than individually row-by-row. Since an unstructured database does not require a fixed set of fields in each record (as in tabular SQL oriented databases), null or placeholder values in the file denote absence of a field so that the ordering of the documents is preserved (i.e. the values of the nth document are stored at the nth value position in the file). Such storage facilitates access because an application seeking particular fields need only access the file of the desired values, rather than processing the entire collection which may be quite large.

Configurations disclosed below depict a system, method and apparatus for storing data, in particular storing unstructured data, typically a JSON form, and arranging, from a data collection of documents having named data fields, data values in a file based on the data field names. Each file has the data values denoted by a common name in the data collection. The data collection is an unstructured data set arranging the data values in an unordered manner according to the data field names and delimiters between the data values, as in a JSON collection or other suitable form. For compound values, such as arrays and subdocuments, data fields corresponding to a compound value are identified, and a separate file generated for storing the contents of the compound value. The resulting columnar files are employed to access the data fields transferred to the files from the collection of documents by identifying a data field name corresponding to a plurality of data values sought for retrieval, and computing the file corresponding to the data field name. Selection of the file name storing the columnar representation of a field occurs via a set of rules outlined below. An application or query engine then retrieves the plurality of data values corresponding to the data field name from the file. Typically a plurality of columnar files are generated to correspond to the fields from the JSON collection. In such a system, the application or query engine then retrieves the plurality of data values independently of retrieval or parsing of the data values corresponding to other data field names in the data collection.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein disclose an example storage system for storing unstructured data as a columnar database as described herein. Depicted below are examples of unstructured data and the corresponding operations and storage arrangements for the columnar form. The examples depict typical scenarios of unstructured data; other forms of unstructured data may be envisioned by compounding and/or aggregating the disclosed approach. The unstructured data as illustrated follows a JSON format, however the illustrated methods and apparatus are equally applicable to other forms of unstructured data, such as an XML form.

Figure 1:
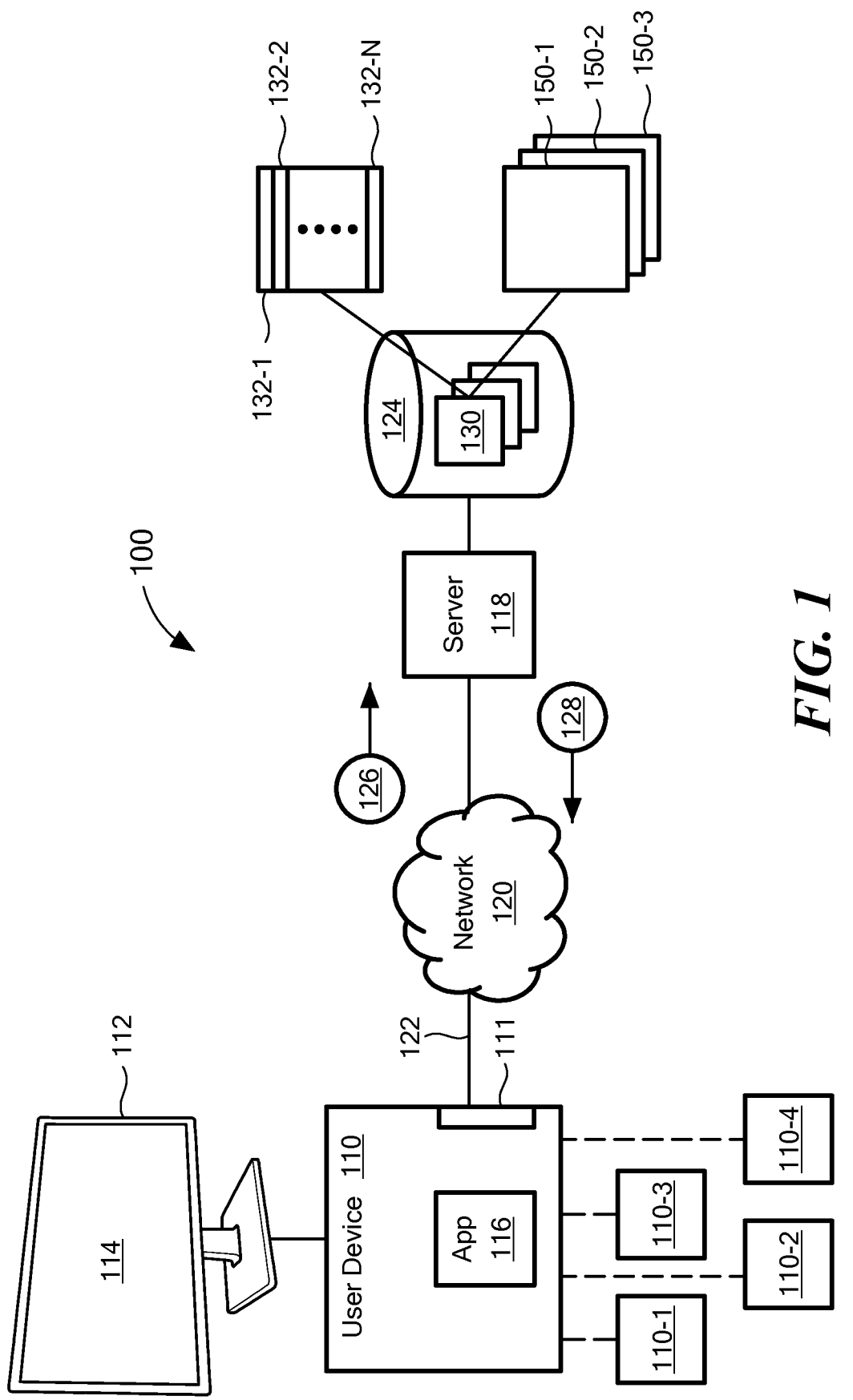
FIG. 1 is a context diagram of a computing environment suitable for use with configurations disclosed herein.

FIG. 1 is a context diagram of a computing environment 100 suitable for use with configurations disclosed herein. The configuration of FIG. 1 shows an example arrangement of computing devices for practicing the principles discussed herein, however any suitable network or local computer platform will suffice. Referring to FIG. 1, a user computing device 110 includes a visual display 112 for rendering a browser or other visual medium, an I/O (Input/Output) interface 111, and an application processor 114 for launching and executing an application 116 for data storage, user queries and/or responses. The visual display 112 present a graphical user interface (GUI) 114 for user interaction, and receives input from a user and renders responses to user queries, as discussed further below. Any appropriate device may be employed, such as mobile devices 110-1 (smartphones, tablets), laptops 110-2, desktops 110-3, or other computing device 110-4 suitable for user interaction, rendering and Internet connectivity. The application 116 interacts with a storage manager 118, which may be accessible via a public access network 120 such as the Internet. The storage manager 118 employs one or more network links 122, for accessing a database 124 such as a non-volatile storage medium and having unstructured data stored in collections 130 and columnar files 150. Each collection includes a number of documents 132-1 . . . 132-n (132 generally). Configurations disclosed herein present a method of storing and accessing the columnar files 150-1 . . . 150-3 (150 generally) for storing the collections 130 of unstructured data. Using operations and methods disclosed further below, collections 130 are stored in columnar files 150 for facilitating and expediting access and usage by a user application 116. Each collection 130 may generate a plurality of columnar files 150 (files). In usage, the application 116 may issue a query request 126 from the user, and invoke the database servers 118 for generating a response 128 for rendering on the display 112.

JSON format is a scripted grammar often implemented in a Unicode text file for describing data items as objects. JSON information is composed of many JSON documents. Each documents can be composed of any number of fields, each of a specific type, and also of any number of subdocuments, each of which is also a JSON document, thus defining a recursive structure. It is possible to store in a field an array of items of the same type or of different types, including arrays and subdocuments. The various documents do not necessarily have the same structure. This kind of approach to information storage is called "unstructured" and is very flexible. This flexibility and ease of use have caused JSON to become the de-facto standard of representing and managing unstructured data in applications. Data volumes have been growing in an exponential rate and most of this growth has been in the unstructured realm, with JSON data (and binary equivalents such as BSON) leading the way.

Because of the popularity of JSON, JSON databases have emerged. Examples include MongoDB and CouchDB. These databases provide APIs to store and retrieve JSON data and documents. In these databases, documents are organized in collections and are stored as such. That means that a collection is maintained as the primary storage mechanism and each document within a collection is stored together. All field of a particular document are maintained together within the databases, stored together, accessed together etc.

Columnar storage is a different approach to storing data. Traditionally, each item to store is composed of a number of fields, each of a prescribed simple type such as a number or a string. All items have the same number of fields and the fields have the same type. Albeit limited in format, it is very fast to retrieve data this way.

Columnar storage techniques are common in relational database management systems (RDBMSs). As RDB sizes grew, query processing times because too large to contain. The industry realized that for large databases (primarily data warehouses), a columnar storage format allows for far better processing times. The main reasons are that common data can be stored together, compression can be more effective because columns of the same type and semantic meaning compress better, etc. Therefore, columnar databases for structured data (such as SybaseIQ, MonetDB and HANA) have been successful in managing large amounts of structured data.

Configurations herein store JSON-based, unstructured data in a columnar format, for quickly retrieving and processing that data. The techniques described are different than column storage for structured data since the same field may have different type in different documents, and since the number of fields and structure of the fields in the different documents may be different, therefore maintaining the relaxed rules of unstructured data and avoiding rigidity of conventional SQL tabular databases.

Figure 2A:
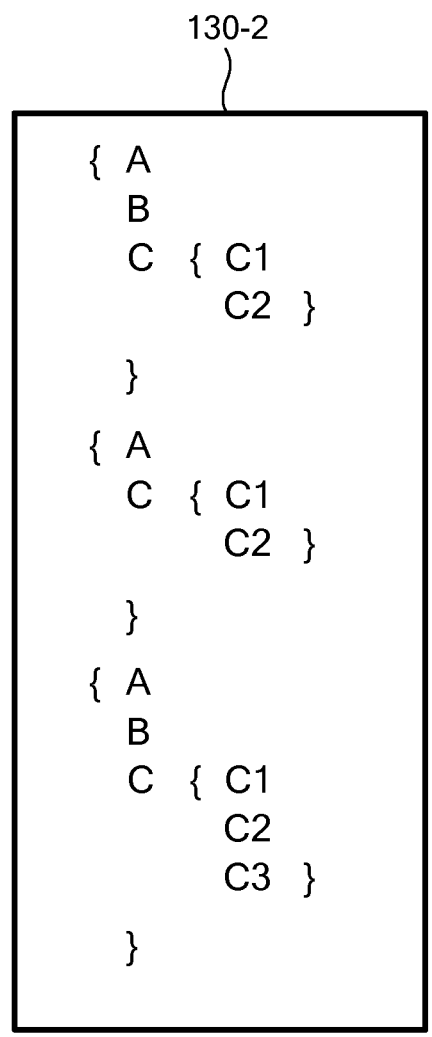
FIGS. 2a-2c are a block diagram of columnar format storage of a collection.
Figure 2B:
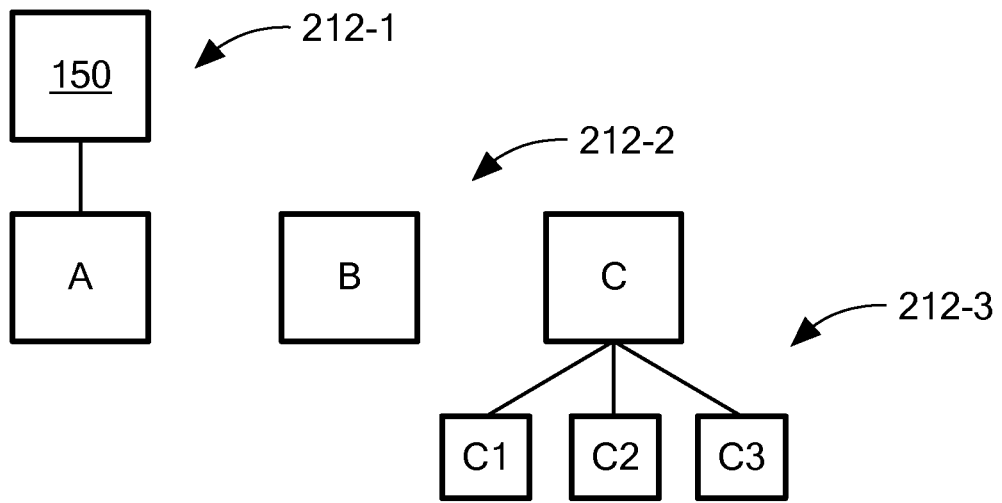
Figure 2C:
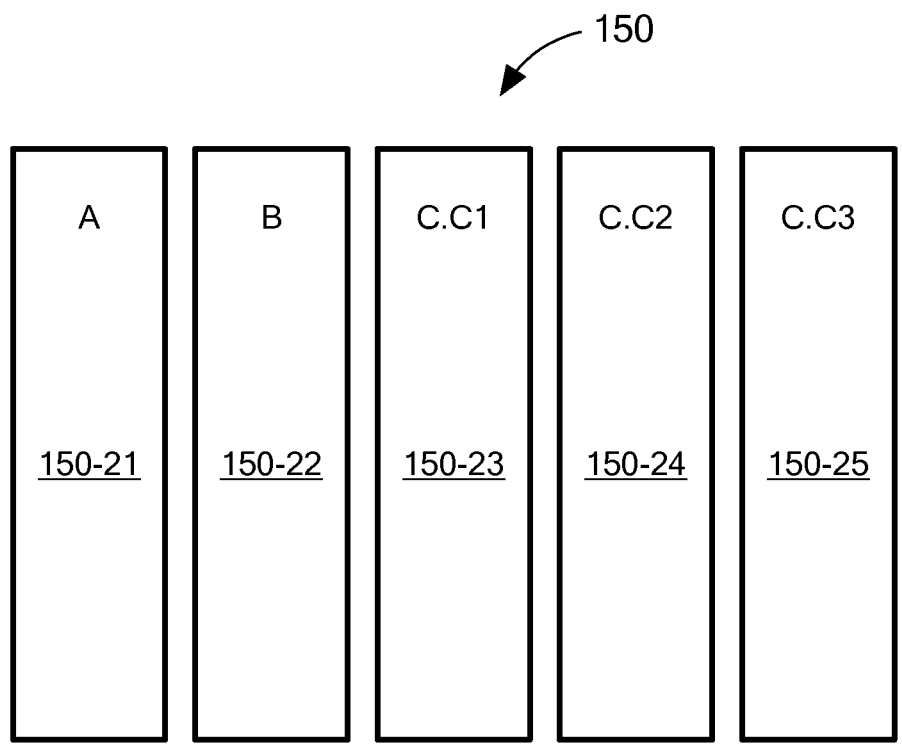

FIGS. 2a-2c are a block diagram of columnar format storage of a collection. Referring to FIGS. 2a-2c, the file 150 is based upon a collection 130-2. In the collection 130-2, the nested structure defines a hierarchy 210 or tree structure (field names only are shown, data values omitted for simplicity). The disclosed approach defines a tree structure corresponding to the fields in the collection, and defines a storage location on a storage medium for each leaf of the tree. In an example arrangement, the storage location may be a file in the host non-volatile storage system, however any suitable arrangement for co-locating similarly named and/or related fields could be employed, such as blocks within the same physical file. The hierarchy has levels 212-1 . . . 212-3 (212 generally). In a larger tree, the nesting and number of levels 212 can become substantial, as each branch may denote another compound type such as an array or subdocument. In such a tree structure, each branch ultimately terminates in a leaf on the lowest level 212. In configurations herein, such a leaf defines an atomic value of a simple type, typically numeric, string, or Boolean/enumerated. In general, the leaf represents a discrete value that cannot be decomposed further, and being an atomic value, is one which may be unambiguously evaluated for output, computation, comparison, etc. Configurations herein generate a file 150-21 . . . 150-25 for each leaf in the tree 210. Accordingly, file 150-21 represents values of A, and file 150-22 represents values of B, named accordingly. Files 150-23 . . . 150-25 respectively represent three fields C1, C2, C3 n a subdocument C, and is named by appending the subdocument subfield name to the parent field name e.g. C.C1 for the file name. Each file 150 therefore represents a column of data defined by the same field across all documents in the collection 130-2, and the set of files 150-21 . . . 150-25 collectively represent the columnar database. A flowchart and storage formats for identifying and managing other combinations of compound types and corresponding files 150 are discussed further below.

Figure 3:
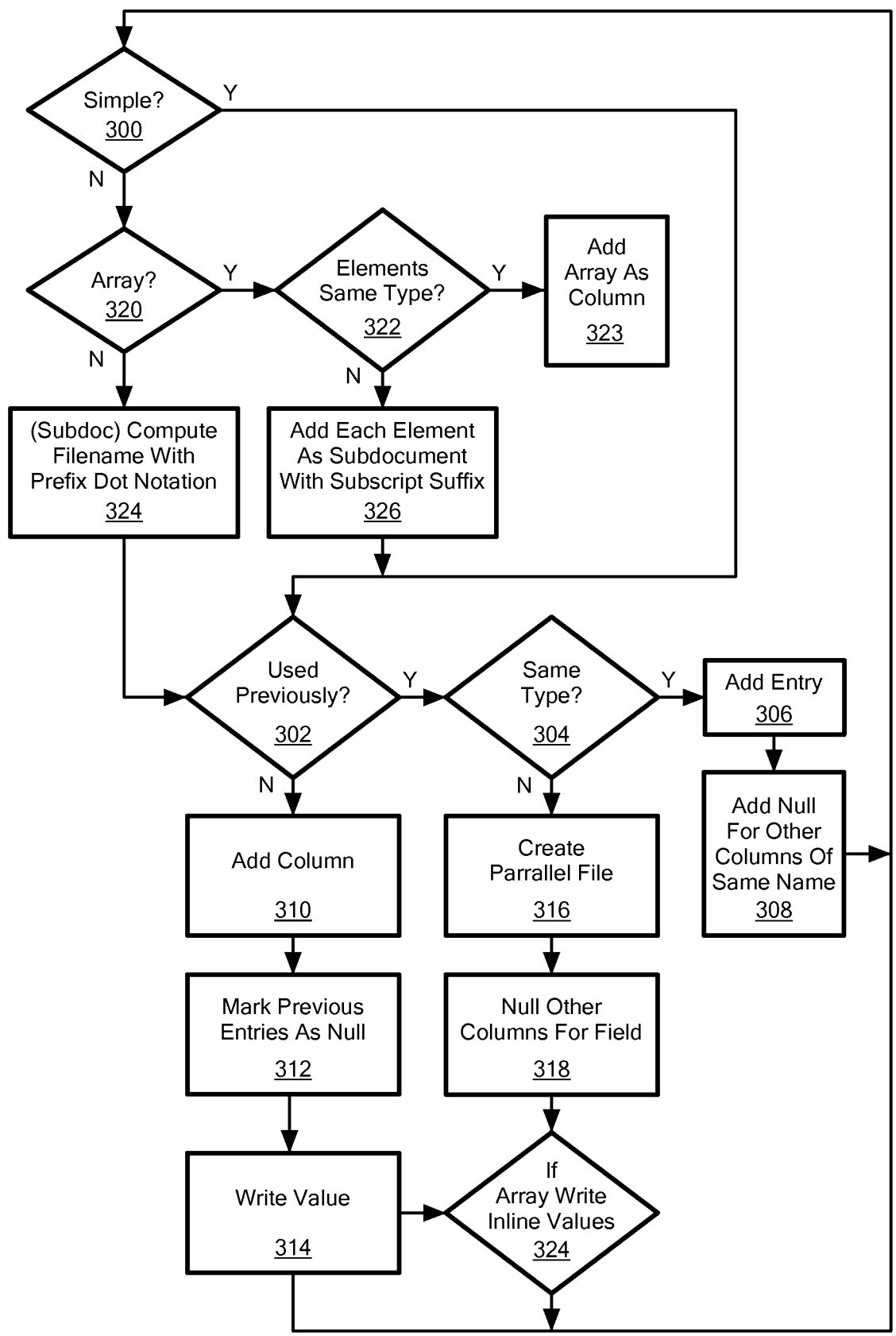
FIG. 3 is a flowchart for generating the columnar files of FIG. 2.

FIG. 3 is a flowchart for generating the columnar files of FIG. 2. In operation, the disclosed method may be employed for transforming unstructured data stores, typically in Unicode character format, to the columnar arrangement disclosed herein. The query and retrieval system of FIG. 1 may then operate on the columnar data files 150 rather than the Unicode JSON files 132. As indicated above, the columnar storage approach achieves substantial performance increase due to the storage of similar fields together in the same file, thus allowing concurrent retrieval of the same field for multiple documents. A particular approach for storing JSON documents in columnar format is described below. The objective of the method of FIG. 3 is to convert the N JSON document to a set of columns. Each column contains metadata and an ordered list of simple data items that are all of the same basic type. For each document in the set, the sequence of FIG. 3 stores and or generates a set of field specific files corresponding to the document, and iterates through each document in the collection.

Referring to FIGS. 1-3, at step 300, for each field in the document, the method performs a check to determine if the field is of a simple type (e.g., string, number, Boolean for the data domain shown). If it is, the value is added based on the type and the field name. A check is performed, at step 302, to determine if the field has been used in a previous document. If the field has been used previously, then a file 150 has been created for the value. The method generates a plurality of files 150 corresponding to a plurality of named data fields from the JSON or scripted data 132, such that the plurality of files is representative of the data collection of documents in a columnar format for accessing a plurality of similarly named data values from a contiguous location defined by the file.

If a file exists, a check is performed to determine if any of the previous documents that used the filed has used it with the same type, as depicted at step 304. If so, then the value is added to the file 150 representative of the column of like-named fields, as shown at step 306. If there are any other files for this field name but for other types, then a null or 0 value is added to the columns that represent this field, but with other types, as shown at step 308, so that the position of values across all the files is preserved to correspond to the document order of the source/original JSON file 132.

If, in the check at step 302, the field has not been used previously, no file 150 will be found named for the field, and a new file 150-N created to represent a new column added to the column storage, and named based on the name of the field, as shown at step 310. If documents have already been processed and this is the first time this field is used, then this fact is marked in the column metadata (header, discussed below), and a number of null or 0 entries are added to the column data preceding the current value to denote the position of the value based on the position of the document, as shown at step 312. The data value of the field is then written to the column, as shown at step 314.

If the check at step 304 indicates that a new type for this field name was received, then a parallel file for the field name is created, as shown at step 316. Null entries are added to this new file to preserve the position order with the existing parallel file, as shown at step 318. The field value it then written to the newly created file following the placeholder nulls. The null fields maintain ordering of the data collection of respective documents such that the ordering of the data fields in the files correspond to an ordering of the data fields in the data collection, by inserting null or zero values as placeholders in the parallel files 150-*n* of the different types to that the file positions correspond to, or "line up" with their counterparts in the document ordering of the JSON file 132.

If the check at step 300 indicates a compound type (i.e. not a simple type), then another check is performed at step 320 to determine if the new field is an array. If so, than the array is examined to determine if all elements of the array are the same type, as shown at step 322

Figures 7, 8:
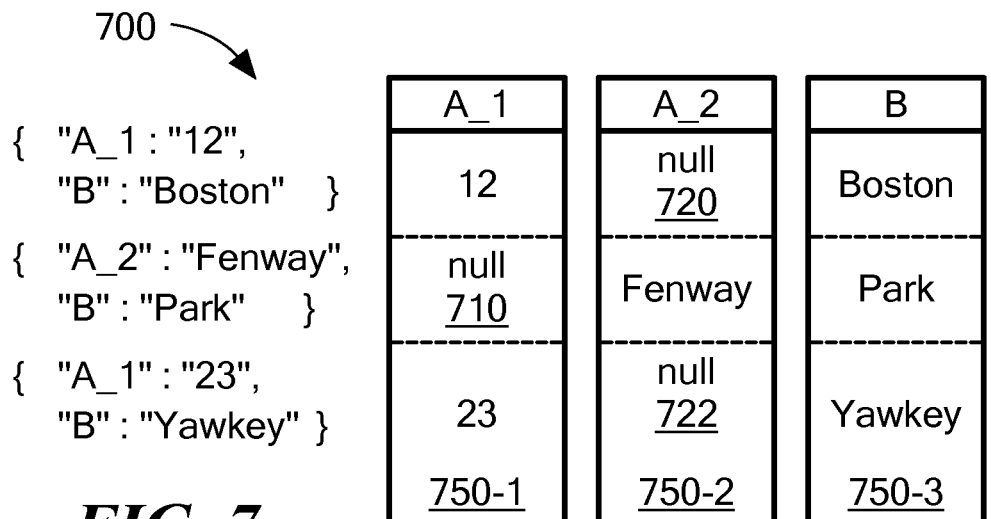
FIG. 7 shows a format for storing undefined fields.
FIG. 8 shows a format for storing nested subdocuments.

If so, the array is added as a column value, at step 323, and control reverts to step 302 and the entire array is added in the same manner as a simple type by writing the array length and all values inline in the same file position, as shown at step 324. At step 324, if the type is an array, the method writes the length of the array and then the values. If the type is a single value, the method writes the value. FIG. 8 shows an example of inline array storage.

If the check at step 320 does not indicate an array, then the field by itself a whole JSON document (a subdocument). In that case, for each field in the subdocument, in the subdocument is treated as a new field, with the name of the field as the name of the field containing the subdocument, a dot, and the name of the field in the subdocument, hence defining a new file for fields nested in the subdocument with the file name prefixed by the name of the parent field, as shown at step 324. Control reverts to step 302 (with the field name appended with the prefix of the parent field), and for any column in the system that did not had a value in this document, marking that fact that this filed has no defined value, by adding a null field to those columns to maintain positional significance of the fields.

Returning to step 322, If step 322 indicates that the array elements are not all the same type, then each element in the array is treated as a subdocument, as shown at step 326, where the fields are the array elements and then field names are 1,2,3, . . . to the number of elements in the array. In other words, each element in the array is added as a new field with the array element index appended as a suffix to the field name.

Therefore, a complex hierarchy of nested subdocuments and arrays may result in a number of files named for the field with prefixes denoting subdocuments and suffixes denoting arrays. Alternative approaches may employ an external or separate file based on a serial number of the value and inserted into the parent field (file) as a pointer. In this manner, the columnar structure and storage is maintained by accommodating a complex hierarchical structure by denoting each atomic or simple field as a separate file, and storing the similarly named fields from the various documents in the collection in the file for grouping the like fields together, hence storing each "leaf" of the tree in a separate file named for its position in the tree.

Figure 4:
FIG. 4 shows a format for storing a collection according to FIG. 3.

Each of FIGS. 4-8 shows a manner of storage for a variety of simple and compound type arrangements. For each, an example document 132 is shown, however is applicable to a sequence of documents in the collection. FIG. 4 shows a format for storing a collection according to FIG. 3. Referring to FIGS. 2-4, a document 400 includes three fields A_string, B_num and C_Bool. Respective files 450-1, 450-2 and 450-3 store each of the values. Additional documents may store fields similarly in the respective files. In this manner, an application 116 seeking only the B_num field, for example, need only access file 450-2 without parsing other fields of the entire collection 300.

Figure 5:
FIG. 5 shows a format for a collection including an array.
Figure 6:
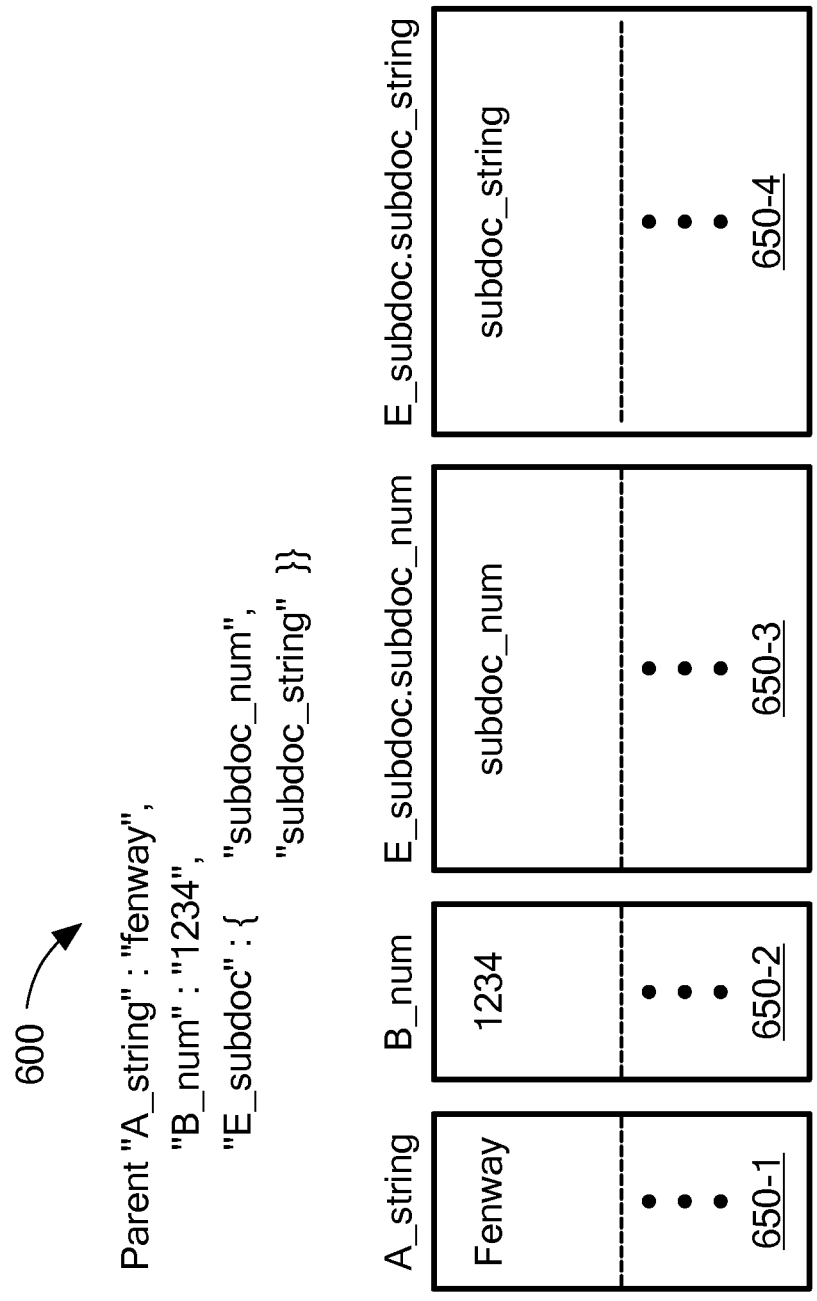
FIG. 6 shows a format for storing a collection including a subdocument.

FIG. 5 shows a format for a document 500 including an array Referring to FIGS. 4 and 5, a file 550-1 . . . 550-3 is created for each field. However, in the case of an array of all the same type, the array elements are stored in consecutive order in the file 550-3. A header, discussed further below, may be included to facilitate retrieval and indicate the ordering and storage format of the individual array elements (e.g. type and length). In dealing with compound fields (arrays and subdocuments), the method identifies a data field corresponding to a compound field, such that the compound filed has a plurality of subfields each having a name and a data value, and generates a separate file for each named subfield in the compound field FIG. 6 shows a format for storing a collection including a subdocument. Referring to FIG. 6, a document in a collection 600 includes A_string and B_string as simple types, and a subdocuement E_subdoc, including subdoc_num and subdoc_string. Filenames are created for each of the simple types 650-1, 650-2 by concatenating the subdocument name with the field name, and respective files of E_subdoc.subdoc_num 650-3 and E_subdoc.subdoc_string 650-4 are created.

FIG. 7 shows a format for storing undefined fields. Referring to FIG. 7, a collection 700 includes three documents with null, or undefined fields. In contrast to tabular databases, since there are no formal field specifications or schemas, documents in unstructured databases may simply omit fields. As indicated above, the files 150 maintain positional relations of the documents in the files, e.g. the $10^{th}$ position in each of the files 150 has corresponding fields from the $10^{th}$ document of the original collection. Collection 700 includes field A_1 in the first and third positions. In file 750-1, named for field A_1, the second position 710, which has no definition of A_1 in the second document, remains null or zero. File A_2 is defined in the second position of collection 700, but not in the first and third documents. Accordingly, positions 720 and 722 in file 750-2 are null. Field B is defined in all three documents in collection 700, hence no null fields are needed in file 750-3.

Figure 9:
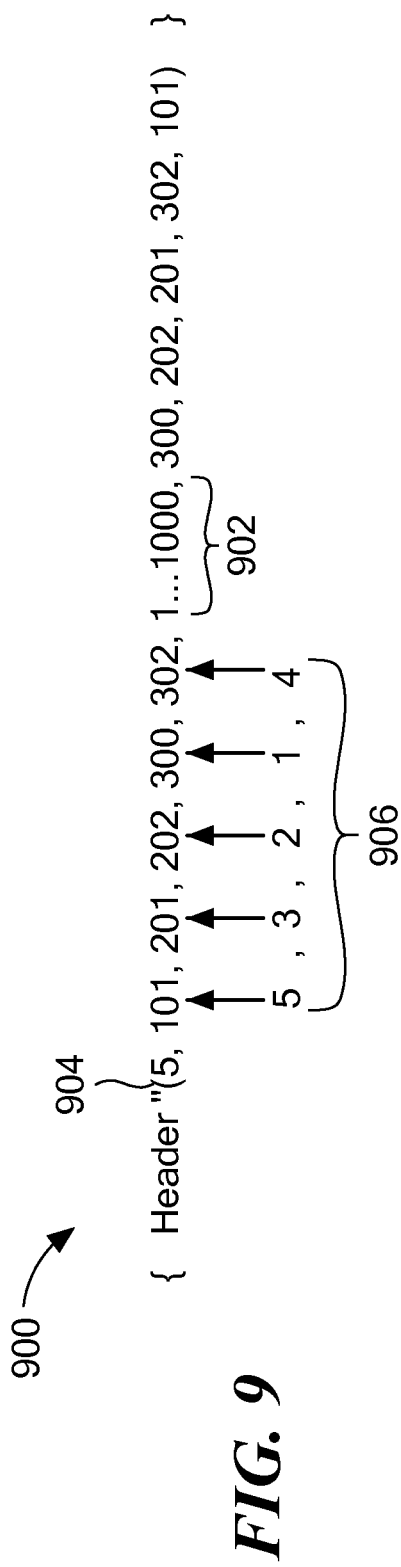
FIG. 9 shows a header for storing consecutive fields as in FIGS. 4-8.

FIG. 8 shows a format for storing nested subdocuments. Referring to FIGS. 8 and 9, a collection 800 includes documents including subdocuments which include compound fields of differing types. In the case of a subdocument, each of the fields may be a simple type, an array, or another subdocument. File 850-1 includes all numeric values for A. Field B is a subdocument, which has a Z field of differing types. Accordingly, subscripted filenames are created for files 850-2 and 850-3, corresponding to each of the types of Z. Undefined values for Z, which occurs at least once in each position, are nulled as in FIG. 7. File 850-2 contains the defined numeric value 810 for Z, and a null in the second position 812. Conversely, file 850-3 stores string values for Z, including "Kenmore" in the second position 820 and null in the first position 822.

For the Y field of subdocument B, the second document 802 has a compound type of array. As with arrays above in FIG. 5, the array elements 830 are stored inline in the second position of file 850-5. In the case of further nesting of compound types, a subdocument in a document is identified as having numerous compound fields requiring many files, and a specific file is designated for storing the fields of the identified subdocument independently from other documents in the collection.

FIG. 9 shows a header for storing consecutive fields as in FIGS. 4-8. In the configurations shown in FIG. 4-8, although the unstructured nature of the JSON databases allows different types of data in consecutive documents even for the same field, trends of data of the same type are often observed for fields of the same name. A header 900 is used to denote sequences of similarly typed data in a file 150 (i.e. column), and facilitate traversal. The header 900 includes a count 904 of the number of consecutive positions having values, and a range 902 denotes a minimum and maximum value in the consecutive positions (minimum and maximum in the range is defined based on sorting/collation and relevant to all types). If all positions are not populated, i.e. there are one or more null fields, a bitmask indicates which positions have values, so that a traversal can identify file positions relative to the documents from the collection (and hence, the fields in other files 150). Further, a sort order 906 contains a sorted list of the values and their positions in the file, to facilitate search operations.

The headers are constructed by identifying a set of related values based on a common data field name, and generating a header indicative of the identified set for storing with the set in the file. The disclosed approach identifies, in the collection, a set of similarly named data fields in consecutive documents having the same type, generates a header based on the identified set, and stores the header in the file appurtenant to the values of the set of similarly named fields.

The headers may include sorted values and/or hashes, and therefore constructing the headers includes identifying a sequence of similarly typed data values, defining the header based on the identified sequence, storing, in the header, the type and number of the data values in the sequence, and sorting the data values and storing the header as a prefix to the data values for facilitating traversal of the data values.

Figure 10:
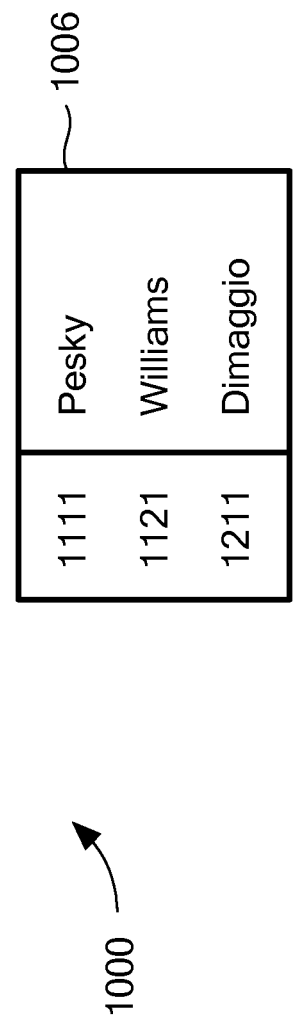
FIG. 10 shows a header for storing strings as in FIG. 4-8.

FIG. 10 shows a header for storing strings as in FIG. 4-8. The header of FIG. 8 lends itself well to numeric data, however string values have differing characteristics. Accordingly, a string header 1000 contains a hash value 1002 of each string, based on computed hash values 1006, and sorted for accelerating searching. In string search operations, a hash mismatch indicates a string inequality, however a hash match should be verified by comparison of the actual strings for verification. Both the strings and the hash values may be compressed, however the string values generally need only be decompressed in the event of a hash match. The string header 1000 also includes a bitmask 1004 in the event one or more fields is null. Both the header 900 and the string header 1000 may limit the number of elements, even if additional similarly typed elements remain in the file, to keep retrievals of the header and associated data to manageable extremes. Therefore, a header for string values is formed by identifying a sequence of string values, and computing a hash of each string value. The computed hashes are then sorted, and stored in the header for subsequent comparison with searched values.

Additional enhancements to increase efficiency and performance are applicable. In general, such efficiencies are cognizant that the flexibility of unstructured data provided by storage as Unicode strings may not necessarily represent the optimal format for searching and processing the data. The above columnar storage mechanisms provide such optimization. In addition, once the data has been decomposed and stored using the mechanisms described above, configurations provide an interface that allow a user to retrieve data using a query language. The data retrieved may be rendered as unstructured data in JSON format for additional unstructured data operations that expect JSON data.

As an example, suppose a user wants to retrieve all or some documents where a given field has some given value, the "search value". The following approach may be employed. From the field name, build the column name. Go over the column's values and look for the search value. When it is found, read from all the columns the value at the same position, to get all the different field values for the same document.

All queries benefit from a set of advantages that make the column store more efficient. The system only needs to traverse the data that is requested (either that is part of the required result set or that is part of the search conditions. Unstructured data can easily contain hundreds or thousands of fields in each document while the query may require use of few or tens of fields. By storing the data in a columnar format and retrieving it this way the system needs to process only a subset of the data—sometimes an order of magnitude or many orders of magnitude less data.

Because the data is compressed by column, but with a separately compressed header, retrieval of the data uses compressed data and decompression only happens on the final subset that is the result of the query.

In a particular arrangement, the disclosed columnar database and files 150 operate in conjunction with the application 116 to invoke a lightweight JSON database on a user mobile device 110. Since such devices tend to be limited on storage and throughput, invocation of a large JSON collection may be infeasible. The lightweight JSON database is a database that maintains JSON documents and provides a set of APIs for storing data, querying data, analyzing data and running algorithms on the JSON data. The data is maintained in a highly compressed format, sometimes stored in a column-oriented way to provide better compression. The system processes queries in a way that only accesses the data that is required versus accessing the entire document and thus consumes less resources. The decision on whether to store and process the data in a column or document oriented manner is an optimization that the system performs.

By storing the data in a JSON format, applications running on the device can access and manipulate this data in a way that is natural to application developers and does not require schema design and impedance mismatch. It is therefore much easier for mobile application developers to use this JSON database than, as an example, a relational database running on the device.

When data is stored in the local JSON databases it is tagged with a change tag. An example of a change tag can be a timestamp of when the data was changed or created. Tagging can be performed at the document level, at the individual data element level or any level in between. These change tags are automatically managed for the application by the database system—it is transparent to the application. Additionally, different tags may be maintained (and different versions of the data accordingly) for different applications if they share data.

When an application wants to get new data or upload its data to a central database, it does not need to manually do so. All that the application needs to perform is a JSON sync. The sync is done with another JSON-oriented database, usually sitting in some central location accessible through the Internet and storing huge volumes of unstructured data in JSON format.

JSON syncs use the change tags described above and annotations that the application makes when it broadcasts its interest in data. Once made, the application no longer needs to deal with the complexities of retrieving remote data and putting it into the local store, does not need to deal with complexities of data merges and does not need to deal with complexities such as schema evolution that make unstructured data so much more flexible, yet harder to manage.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In an unstructured data environment having an unstructured data file for query and retrieval by a query engine response to user queries, a method for transforming unstructured data in the unstructured data file to a columnar data file for query retrieval, comprising:
    identifying a data collection of unstructured data in the unstructured data file, the data collection having documents including named data fields of data values;
    transferring, from the data collection, the data values to a file storage medium based on the names of the data fields, the file storage medium having the data values denoted by a common data field name from the data collection;
    the data collection including a sequence of documents in the unstructured data file, each document in the sequence of documents defining the data values according to the data field names further comprising:
    generating, for each unique data field name in the data collection, a columnar data file, each columnar data file containing a sequence of values of similarly named data fields having a similar type and stored in a sequence of contiguous values according to their appearance in the documents of the data collection;
    generating a separate columnar data file based on a second named data field of the data field names in the data collection when at least one document in the data collection includes a different data field name, the generated columnar data file including similarly typed values of the named data field for each document in the data collection that includes a value for the named data field, the generated columnar data file stored based on a network link used to access the file and a retrieval speed of the network link;
    further comprising generating a separate columnar data file upon occurrence of:
        a new unique data field name occurs in a document of the data collection;
        a data field corresponding to a new compound field occurs in the document of the data collection, the new compound field having a plurality of subfields each having a name and a data value, further comprising defining a separate file for each named subfield in the compound field;
        a new data type occurs for a data field name already existing as a columnar data file for the collection;
    for each columnar data file generated, storing the data values at a position in the generated file which corresponds to a position of the document in the data collection from which the data values were transferred, position being preserved by null indicators corresponding to documents in the data collection devoid of a corresponding named field, each columnar data file storing the data values of the similarly named data fields at contiguous locations in the columnar data file, for query based retrieval of a plurality of data values independently of retrieval or parsing of the data values corresponding to other data field names in the data collection;
    generating for each columnar data file generated, a header indicative of the identified set for storing with the set in the columnar data file;
    performing a check for determining, for the generated columnar data file, whether the data type of the data values in the columnar data file from among numeric values and string values;
    when the data type is numeric values:
        storing, in the header, a file range denoting a minimum and maximum value of the numeric values in consecutive positions in the columnar data, the minimum and maximum values for determining a presence of a queried value in the columnar data file;
    when the data type is string values:
        computing a hash of each string value;
        sorting the computed hashes; and
        storing the computed hashes in the header for subsequent comparison with searched values;
    upon receipt of a request for querying the columnar data files:
        identifying a plurality of data field names for retrieval based on the query request;
        identifying a columnar data file storing values corresponding to one of the data field names of the plurality of data field names based on the query request;
        retrieving a first value from the identified columnar data file; and
        retrieving a second value from the identified columnar data file, the second value corresponding to the same data field name as the first value and retrieving the second value after the first value and before retrieving any other values corresponding to the plurality of data field names based on the query request, the first value and the second value stored in contiguous locations in the identified columnar data file.

2. The method of claim 1 further comprising accessing the data fields in the collection of documents by:
    identifying a queried field name corresponding to a plurality of data values sought for retrieval;
    computing a location on a columnar data file corresponding to the queried field name; and
    retrieving the plurality of data values corresponding to the queried field name from the columnar data file.

3. The method of claim 2 further comprising retrieving the plurality of data values independently of retrieval of the data values corresponding to values of other data field names in the data collection stored in other columnar data files.

4. The method of claim 1 further comprising:
    identifying, in the data collection, a set of similarly named data fields in consecutive documents having the same type;
    generating a header based on the identified set; and
    storing the header in the file appurtenant to the values of the set of similarly named and similarly typed fields.

5. The method of claim 1 further comprising:
    defining a tree structure corresponding to the data field names in the collection, the tree having branches and leaves; and
    defining a columnar data file for each leaf of the tree.

6. The method of claim 1 further comprising:

identifying a subdocument in a collection as having numerous compound field names requiring multiple files; and designating a specific columnar data file for storing the values of the compound field names of the identified subdocument independently from values of other data field names in the collection.

7. The method of claim 1 further comprising maintaining ordering of the documents of the data collection such that the ordering of the data fields in the respective columnar data files correspond to an ordering of the data fields in the data collection.

8. The method of claim 1 wherein each of the columnar data files defines a leaf of a hierarchical tree representing the named data fields, each leaf corresponding to a named data field having an atomic data value.

9. The method of claim 1 wherein each columnar data file contains only values from similarly named fields of the documents in the collection.

10. The method of claim 1 wherein data values from the data collection having the same data field name and data type occupy the contiguous locations in the columnar data file.

11. The method of claim 1, further comprising:

parsing the data collection for identifying at least one set of commonly named data fields occurring in a plurality of documents in the data collection; and grouping the data values corresponding to the set of commonly named data fields for storage in a single columnar data file.

12. The method of claim 1 wherein, when the generated columnar data file contains numeric values, storing, in the header:

a count of the number of populated, non-null data values in the columnar data file;

a bitmask indicative of locations in the file populated with the non-null data values; and a sort order indicating a sorted list of the positions of the data values in the columnar data file.

13. The method of claim 1 further comprising:

receiving a query request traversing a plurality of the columnar data files based on the query request;

examining the header of a columnar data file of the traversed plurality of columnar data files; and concluding, from the examined header, that a value for satisfying the query request is not located in the columnar data file.

* * * * *